United States Patent [19]

Grudich

[11] 4,286,444
[45] Sep. 1, 1981

[54] HAND PROPELLED YARD MACHINERY HANG-LOCK DEVICE

[76] Inventor: Nicholas Grudich, 17285 Meryweather, Mount Clemens, Mich. 48044

[21] Appl. No.: 27,310

[22] Filed: Apr. 5, 1979

[51] Int. Cl.³ .............................................. E05B 65/48
[52] U.S. Cl. .......................................... 70/13; 70/61
[58] Field of Search ....................................... 70/2–13, 70/57–58, 61–62, 207, 234; 292/281; 211/4, 5, 7, 8; 248/551, 552, 553

[56] References Cited

U.S. PATENT DOCUMENTS

| | | | |
|---|---|---|---|
| 590,425 | 9/1897 | Smart | 70/234 |
| 3,081,056 | 3/1963 | Young | 70/61 |
| 3,934,436 | 1/1976 | Candlin | 70/234 |

FOREIGN PATENT DOCUMENTS 806942  6/1951  Fed. Rep. of Germany .............. 70/61

*Primary Examiner*—Robert L. Wolfe
*Attorney, Agent, or Firm*—Gerald R. Hershberger

[57] ABSTRACT

A hang-lock device adapted to be fastened to a wall for hanging a hand propelled yard machine such as a snow thrower, or lawn mower, by a tubular portion of its structure, and for simultaneously protecting such machine against theft.

The device includes a bracket portion mounted to a wall with blind screws, a lower, relatively wide, jaw cavity depending from the bracket portion for containing a confined structural part of the machine therein. An upper jaw latch plate is hinged pivotably to the upper horizontal edge of the bracket portion against the wall, extends downwardly therefrom, and overlaps the forward lip of the lower jaw a substantial distance to form a latchable and unlatchable closure around the confined structure of the machine.

A hasp is fixedly fastened to the forward lip of the jaw cavity, which hasp extends through and registers with a closely fitting opening in the lower portion of such upper latch jaw. A padlock or similar fastening means is then inserted through the hasp to prevent unauthorized opening of the closure to remove the machine therefrom.

1 Claim, 4 Drawing Figures

U.S. Patent
Sep. 1, 1981
4,286,444
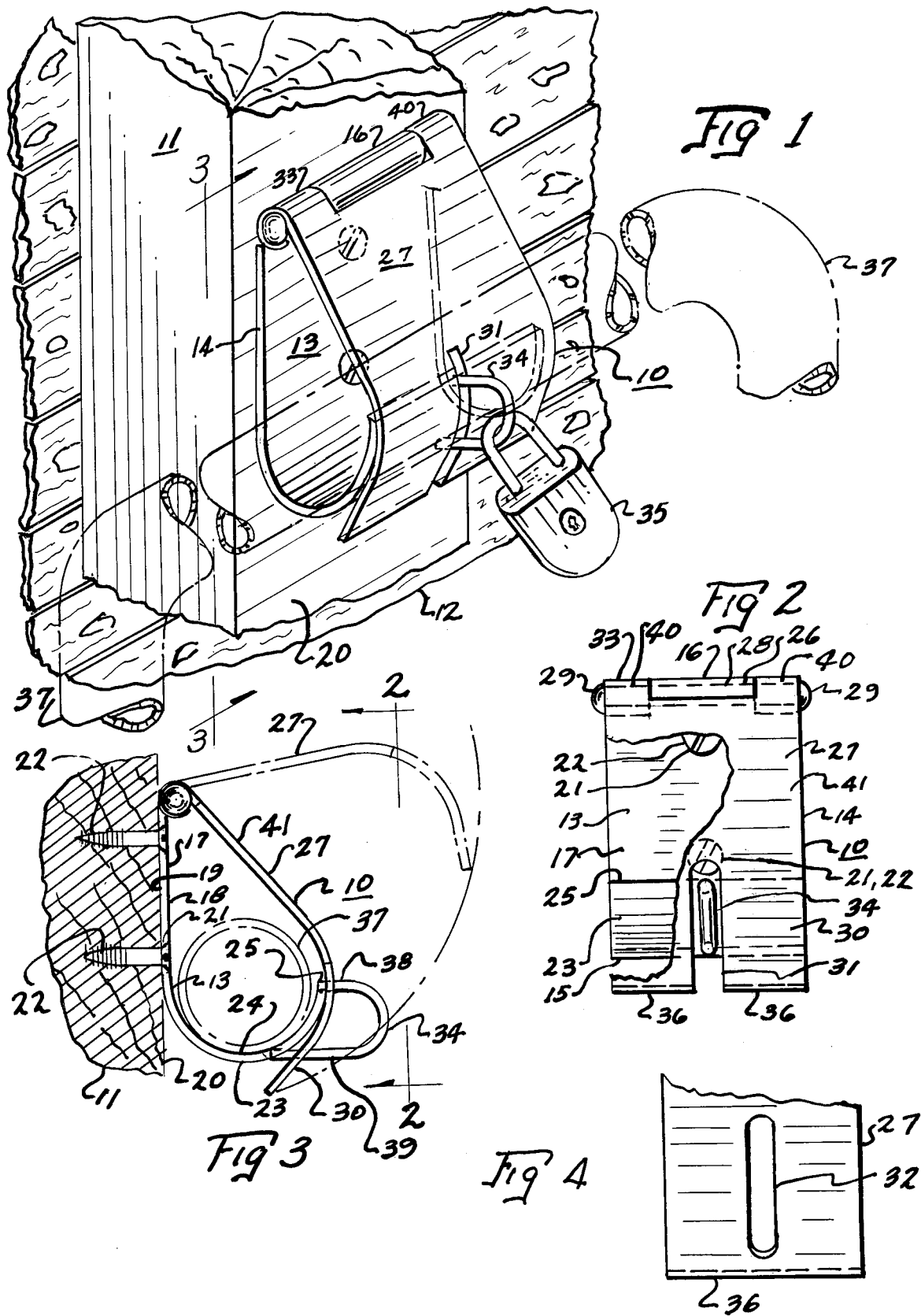

HAND PROPELLED YARD MACHINERY HANG-LOCK DEVICE

BRIEF SUMMARY OF THE INVENTION

This invention relates generally to theft protection devices for hand propelled machinery and particularly to a hang-lock device for snow throwers, lawn mowers, and the like.

The use of such machines, such as power snow throwers, power lawn mowers, and other such devices is constantly increasing throughout the country due to their utility and labor saving features. However, the increase in usage and availability of such machines has resulted in a corresponding increase in the number of such machines that are being stolen. A contributing factor to such thefts is the relatively small size and portability of such machines which permits them to be easily carted away when they are not securely fastened or locked away.

Such machines are commonly stored in garages when not in use, and are often stolen from inside the garage due to such ease of transporting them.

There is no present means available for quickly, efficiently, and conveniently storing and locking such machines against pilferage and theft, and the present invention was conceived and developed with the intention of alleviating such problems.

It is accordingly an object of this my invention to provide a utilitarian, efficiently operating, and conveniently arranged hang-lock device which is readily attachable to a walled surface such as a garage wall, and which has provisions for hanging and locking a yard machine by a confined structural part, such as its handle.

It is another object of this invention to provide a hang-lock device which is for the greatest part constructed of sheet metal stampings which can be manufactured in large quantities at comparatively low cost to the consumer.

It is a further object of this invention to provide a hang-lock device which combines a wall bracket means for hanging an article in a secure position and which combines the bracket for hanging, a jaw or cavity for receiving the article, and a latch for closing the cavity with a hasp for locking the latch in closed position all in one unit.

The present invention may be better understood and numerous other features and advantages thereof will become apparent to those skilled in the art by reference to the accompanying drawing wherein like reference numerals refer to like elements in the various figures in which:

FIG. 1 is a pictorial view showing my device installed on a garage wall with a power snow thrower handle, or the like, secured therein.

FIG. 2 is an elevational view taken in direction of arrows 2—2 of FIG. 3.

FIG. 3 is an end view thereof taken in direction of arrows 3—3 of FIG. 1.

FIG. 4 is an elevational view of the latch plate showing a closed slot for receiving the hasp.

Referring now in detail to the drawing, the numeral 10 denotes my Hand Propelled Machinery Hang-Lock Device constructed in accordance with my invention. It is shown as mounted on a stud 11 of garage wall 12.

My invention comprises wall defining a generally rectangularly outlined, elongated, sheet metal bracket 13 having parallel side edges 14, a horizontal bottom surface or extremity 24, and horizontal upper bracket hinge edges 16. Said bracket includes a generally flat, rectangularly outlined wall contacting portion 17 depending downwardly from and adjacent said hinge edges, which portion includes a front face 18 and a rear face 19 which is fastened to front wall 20 of stud 11 on vertical wall 12. Centrally located, vertically aligned and spaced, countersunk screw fastening openings 21 extend through said bracket wall portion front and rear face to receive wood screws 22 to fixedly secure said bracket to said stud.

A forwardly cantilevered, concave, jaw-like, tube or handle retaining portion 23 depends downwardly and forwardly from said bracket wall contacting portion to said bottom extremity and upwardly in semi-cylindrical outline to terminate along horizontally disposed transverse edge or lip 25. The size of said semi-cylindrical, jaw-like cavity portion 23 is of sufficient depth between the front face 18 and lip 25, and below said lip to said bottom extremity to provide space for approximately one-half of a machine part or handle up to one and one-eighth diameter. The width of said bracket is between one and one-half to two inches wide to provide stability to the handle 37 of the machine when same is placed in the jaw preparatory to hanging and locking the machine on the wall 12.

I further provide walls defining an elongated sheet metal upper latch plate 27 having substantially the same width as said bracket. Said plate is pivotably hinged at its upper edge 33 by means of latch interlocking bores 40 and bracket interlocking bores 26, and hinge pin 28 which secures said bores in line for pivoting. The pin 28 is peened over side edges 14 and capped at each end 29, to prevent removal thereof after installation. Said latch plate or leaf 27, when closed over said lip, depends downwardly and outwardly angularly from said latch hinge edges so as to overlap said lip with a substantial portion 30 thereof extending below said lip and curved inwardly around said lip and jaw cavity to terminate at lower edge 36. Said latch plate lower portion 30 has a slotted opening 31 for receiving a hasp 34 in close relationship therethrough width-wise, and of sufficient length vertically to clear said hasp when said latch is opened and closed thereover. Said slot may be of U-shape as shown in FIG. 2, or a continuous slot 32, as shown in FIG. 4, of elongated outline.

The U-shaped staple or hasp member 34 is fixedly fastened by welding or other suitable means below and adjacent said lip so that relatively short leg 38 is adjacent said lip and longer leg 39 is adjacent said bottom extremity. Said hasp is long enough horizontally to extend substantially beyond said latch plate through said slotted opening when said latch plate is lowered over said lip. The fastening screws 22 are covered by latch plate walls 41 so that they are inaccessible to persons attempting to open the device without authorization. A padlock 35 or other suitable fastening and locking means is passed through said hasp for fixing or securing said plate to said bracket jaw portion 23 forming a closure over said machine part or handle 24.

In operation, my hang-lock device is fastened to a suitable garage wall stud or vertical surface, sufficiently high enough from the floor so that the machine will hang freely. The handle or other suitable portion of the machine is placed in the jaw cavity and balanced therein, the leaf or plate is lowered over the hasp enclosing the handle therein, and a suitable locking device is placed through said hasp securing the machine against theft.

While there is here shown and described specific embodiments of this invention, the latter is not limited to the exact details of construction set forth, and the invention embraces such changes, modifications and equivalents of the parts and their formation and arrangement as come within the purviews of the appended claims.

We claim:

1. A hang-lock device adapted to be fastened to a wall for hanging and locking a hand propelled machine to prevent theft thereof comprising:

walls defining a generally rectangularly outlined, flat, sheet metal bracket portion having a front face and a wall contacting face and side edges;

a cantilevered, jaw-like cavity portion attached to the bottom edge of said bracket portion coterminious therewith width-wise depending downwardly and forwardly in substantially circular cylindrical outline upwardly to a cavity lip disposed horizontally with the bottom of said cavity;

spaced screw openings to fasten the device to such wall extending through said front and rear faces of said bracket portion;

walls defining an elongated sheet metal upper leaf pivotably hinged by a hinge pin to the upper edge of said bracket portion, said hinge pin being capped to prevent removal thereof after installation, said leaf depending downwardly and outwardly from said hinge pin so as to overlap said lip a substantial distance below said lip and jaw cavity, said latch leaf having at its lower portion below said lip a slotted opening for receiving a hasp therethrough; and a U-shaped hasp member having its ends fixedly attached to said jaw-like member below and adjacent said lip so that when said leaf is closed the hasp extends through said leaf preventing said leaf from being opened when a locking means is passed through said hasp.

* * * * *